(12) United States Patent
Wilson

(10) Patent No.: US 7,379,562 B2
(45) Date of Patent: May 27, 2008

(54) DETERMINING CONNECTEDNESS AND OFFSET OF 3D OBJECTS RELATIVE TO AN INTERACTIVE SURFACE

(75) Inventor: Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 10/814,761

(22) Filed: Mar. 31, 2004

(65) Prior Publication Data
US 2005/0226505 A1    Oct. 13, 2005

(51) Int. Cl.
  G06K 9/00 (2006.01)
  G06K 9/34 (2006.01)
  G06K 9/38 (2006.01)
  G01C 3/08 (2006.01)

(52) U.S. Cl. .............. 382/103; 382/106; 382/171; 382/172; 382/173; 382/180; 356/4.07

(58) Field of Classification Search .............. 382/103, 382/106, 154, 171–173, 180; 356/4.07
See application file for complete search history.

(56) References Cited

U.S. PATENT DOCUMENTS

| | | | |
|---|---|---|---|
| 4,992,650 A | 2/1991 | Somerville | 235/462 |
| 5,424,823 A * | 6/1995 | Nettles et al. | 356/5.01 |
| 5,436,639 A | 7/1995 | Arai | |
| 5,479,528 A * | 12/1995 | Speeter | 382/115 |
| 5,483,261 A | 1/1996 | Yasutake | |
| 6,128,003 A | 10/2000 | Smith | |
| 6,266,061 B1 | 7/2001 | Doi | |
| 6,522,395 B1 | 2/2003 | Barnji | |
| 6,529,183 B1 | 3/2003 | MacLean | |

(Continued)

FOREIGN PATENT DOCUMENTS

| | | |
|---|---|---|
| EP | 0690407 | 1/1996 |
| FR | 27656077 | 5/1998 |
| WO | 9819292 | 5/1998 |

OTHER PUBLICATIONS

Xu et al. ("A Robust Close-range photogrammetric system for industrial metrology," 7th Int'l Conf. on Control, Automation, Robotics and Vision, Dec. 2002, pp. 114-119).*

(Continued)

Primary Examiner—Matthew C. Bella
Assistant Examiner—Yubin Hung
(74) Attorney, Agent, or Firm—Workman Nydegger

(57) ABSTRACT

A position of a three-dimensional (3D) object relative to a display surface of an interactive display system is detected based upon the intensity of infrared (IR) light reflected from the object and received by an IR video camera disposed under the display surface. As the object approaches the display surface, a "hover" connected component is defined by pixels in the image produced by the IR video camera that have an intensity greater than a predefined hover threshold and are immediately adjacent to another pixel also having an intensity greater than the hover threshold. When the object contacts the display surface, a "touch" connected component is defined by pixels in the image having an intensity greater than a touch threshold, which is greater than the hover threshold. Connected components determined for an object at different heights above the surface are associated with a common label if their bounding areas overlap.

20 Claims, 10 Drawing Sheets

U.S. PATENT DOCUMENTS

| | | | |
|---|---|---|---|
| 6,614,422 | B1 | 9/2003 | Rafii |
| 6,674,900 | B1* | 1/2004 | Ma et al. .................... 382/176 |
| 6,710,770 | B2 | 3/2004 | Tomasi |
| 6,720,949 | B1 | 4/2004 | Pryor |
| 7,084,859 | B1 | 8/2006 | Pryor |
| 2001/0012001 | A1 | 8/2001 | Rekimoto |
| 2003/0161524 | A1 | 8/2003 | King |
| 2003/0235341 | A1* | 12/2003 | Gokturk et al. ............. 382/243 |
| 2004/0090524 | A1 | 5/2004 | Belliveau |
| 2004/0135824 | A1* | 7/2004 | Fitzmaurice ................ 345/856 |
| 2004/0196371 | A1 | 10/2004 | Kono |
| 2005/0245302 | A1 | 11/2005 | Bathiche |
| 2005/0277071 | A1 | 12/2005 | Yee |
| 2005/0281475 | A1 | 12/2005 | Wilson |
| 2006/0010400 | A1 | 1/2006 | Dehlin |

OTHER PUBLICATIONS

Tanaka et al. ("Development of a video-rate range finder using dynamic threshold method for characteristic point detection," Int'l Conf. on Advanced Intelligent Mechatronics, Sep. 19-23, 1999, pp. 932-937).*

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1, 2-Dimensional Bar Code Page." Available http://www.adams1.com/pub/russadam/stack.html. Printed Jan. 20, 2004, 14pp.

Ambiente article. "InteracTable®." Dated Jul. 7, 2000. Available http://www.darmstadt.gmd.de/ambiente/activities/interactable.html. Printed Nov. 21, 2003. 3pp.

Bier, Stone, Pier, Buston, and DeRose. "Toolglass and Magic Lenses: The See-Through Interface." *Proceedings of Siggraph '93* (Anaheim, August). *Computer Graphics Annual Conference Series*, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004#3. Printed Apr. 30, 2004. 5pp.

Dietz and Leigh. "DiamondTouch: A Multi-User Touch Technology." *UIST '01* Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2 pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6 pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS332B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Bllinghurst, Poupyrev, Imamoto, and Tachibana. "Virtual Object Manipulation on a Table-Top AR Environment." *IEEE and ACM Int'l Symposium on Augmented Reality 2000, ISAR'2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrel, Bilezikjian, and Landay. "The Designers' Outpost: A Tangible Interface for Colaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicopm '03)*, Oct. 12-15, 2003, Seattle, Washington. 2pp.

Malandain, Grégoire. "Connected Components Extraction." Available http://www-sop.inria.fr/epidaure/personnel.malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptual User Interactes (PUI '97)*, 1997. 3pp.

Rekimoto and Nagao. "The World through the Computer: Computer Augmented Interaction with Real World Environments." *Proceedings of UIST '95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." *Short Talks. CHI 2000* Mar. 31-Apr. 5, 2001. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Availble http://www.tabletpchome.com/Messages.aspx?ThreadID=140. Printed Dec. 30, 2003. pp. 1-2 of 5.

Schmalsteig, Encarnaçã, and Szalavári. "Using Transparent Props for Interaction With The Virtual Table." Presented at *1999 ACM Symposium on Interactive 3D Graphics ( I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, and Bernier, Forlines, and Frost. "Sharing and Building Digital Group Histories." *CSCW'02*, Nov. 16-20, 2002, New Orleans, Louisiana. © 2002 ACM 1-58113-560-2/20/0011. 10pp.

Shen, Lesh, Moghaddam, Beardsley, and Bardsley, "Personal Digital Historian: User Interface Design." © Mitsubishi Electric Research Laboratories, Inc. 2001. Cambridge, Massachusetts. 5pp.

SMART Technologies Inc. White Paper. "DViT Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware.index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jügen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (UIST'01)*, ACM Press (CHI Letters 3(2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlock: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VIRTUALBOARD." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3p.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/30/0010. pp. 193-202.

Office Action mailed Aug. 30, 2007 cited in related U.S. Appl. No. 10/870,777.

Office Action mailed Jun. 29, 2007 cited in related U.S. Appl. No. 10/834,675.

Pavlidis, Ioannis, et al. "A Vehicle Occupant Counting System Based on Near-Infrared Phenomenology and Fuzzy Neural Classification", IEEE Transactions on Intelligent Transportation System, New York, NY, vol. 1, No. 2., Jun. 2000, pp. 78-80.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Hardenberg Von. Christian, "Fingertracking and Handposture Recognition for Real-Tim Human-Computer Interaction", Berlin, Jul. 20, 2001.

Shen, Vernier, Forline, and Ringel. "DiamondSpin: An Extensible Toolkit for Around-the-Table Interaction." CHI 2004, Apr. 24-29, 2004, Vienna, Austria. © 2004 ACM 1-58113-702-Aug. 4, 2004. 8pp.

Office Action mailed Dec. 13, 2007 cited in related U.S. Appl. No. 10/834,675.

Office Action mailed Oct. 9, 2007 cited in related U.S. Appl. No. 10/867,434.

\* cited by examiner

DETERMINING CONNECTEDNESS AND OFFSET OF 3D OBJECTS RELATIVE TO AN INTERACTIVE SURFACE

FIELD OF THE INVENTION

The present invention generally pertains to visually detecting objects that are adjacent to a display surface of an interactive display system, and more specifically, pertains to detecting connected pixels in an image of an object and determining its relative separation from the display surface, where the image is formed in response to light reflected from the object through the display surface.

BACKGROUND OF THE INVENTION

Several interactive displays are known in the prior art. For example, a user interface platform was developed in the MIT Media Lab, as reported by Brygg Ullmer and Hiroshi Ishii in "The metaDESK: Models and Prototypes for Tangible User Interfaces," *Proceedings of UIST October* 1997:14-17. This article describes how the metaDESK includes a near-horizontal graphical surface that is used to display two-dimensional (2D) geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface to provide images that are visible to a user from above the graphical display surface. The article further teaches that the IR camera can detect a distinctive pattern provided on the undersurface of passive objects called "phicons" that are placed on the graphical surface. Thus, the IR camera detects an IR pattern (which is transparent to visible light) applied to the bottom of a "Great Dome phicon" and responds by displaying a map of the MIT campus on the graphical surface, with the actual location of the Great Dome in the map positioned where the Great Dome phicon is located. Moving the Great Dome phicon over the graphical surface manipulates the displayed map by rotating or translating the map in correspondence to the movement of the phicon by a user. Clearly, the IR vision-sensing system used in this prior art interactive display is able to detect objects like the phicon, based upon the pattern applied to it. There is no discussion of details involved in simply detecting an object without a pattern, or in determining a relative position of an object above the display surface.

A similar technique for sensing objects on a display surface is disclosed in several papers published by Jun Rekimoto of Sony Computer Science Laboratory, Inc., in collaboration with others. These papers briefly describe a "HoloWall" and a "HoloTable," both of which use IR light to detect objects that are proximate to or in contact with a display panel on which a rear-projected image is visible. The rear-projection panel, which is vertical in the HoloWall and horizontal in the HoloTable, is semi-opaque and diffusive, so that objects reflecting IR light back through the panel become more clearly visible to an IR camera as they approach and then contact the panel. The objects thus detected can be a user's fingers or hand, or other objects. Again, these papers are generally silent regarding the process used for detecting an object based upon the IR light reflected from the object and also fail to discuss determining the relative separation between an object and the display surface.

Clearly, it is known in the art to employ reflected IR light to detect an object placed on a diffusing display surface. The present invention also relates to sensing objects on the display surface of a novel interactive display system that is similar in some ways to the prior art interactive display systems discussed above. This new interactive display table employs a computer vision-based sensing system that produces a signal corresponding to an image of the display surface that indicates where objects that reflect IR light are placed on the display surface. In particular, the pixel intensity at each pixel location in this image indicates whether there is any IR reflective material at that location on the table, but it is still necessary to determine the precise location of an object on the physical display surface, particularly, since an object can appear in the image as a plurality of objects, particularly if the object is not fully in contact with the diffusing display surface. The actual number of objects and their location on the display surface are important to enable software applications to reason about objects on the table surface and to understand the objects' shapes and sizes. For example, a graphic image may be projected directly next to, under, around or in any appropriate relationship to an object on the display surface. It is therefore important to determine various shape characteristics of objects computed from the IR image of the display surface. This function is not provided by touch-sensitive surfaces or screens, for example, most of which are limited to reasoning about one or more discrete points on the surface that correspond to the user's touch. And, it is not clear that prior art interactive display systems determine a relative distance of an object away from the display surface. "Hover state" refers to whether an object is touching the surface of a display surface of an interactive display system ("not hovering"), or is disposed just above the surface of the table ("hovering"). Hover is used in a number of interfaces (e.g., the TabletPC™) to provide a user with pointing feedback without invoking selection, for example, particularly when the pointing device does not have a button for indicating selection. To recover hover state of an object such as the user's finger, it is important to make use of the diffusing display surface, which only reveals objects that are touching or are very close to the display surface of the table in the image produced by the IR vision-sensing system.

A given object will appear brighter in the IR image produced for the display surface, the closer the object is to the display surface. Thus, it would be desirable to determine the maximum brightness of an object, e.g., through a calibration, so that the brightness of the object's IR reflection can be related to the height of the object above the display surface. It would also be desirable to know precisely when an object changes state from hovering just above the display surface to actually touching the display surface.

SUMMARY OF THE INVENTION

The present invention makes use of connected components in binarized images formed from IR light reflected from an object and received by a light sensor to determine whether an object is near (and relatively how near) a display surface of an interactive display system and to determine when the object has actually contacted the display surface. A connected component in a binarized image is a subset of pixels in which all pixels are "on" (e.g. white or lit) in the binarized image, and wherein each pair of pixels may be connected by some path through the image including only pixels that are on. Thus, a connected component in a binary image of the display surface generally corresponds to a distinct object that is either on or just above the display surface, although it is possible for a single physical object to correspond to multiple connected components in the IR image. A user's finger (i.e., the object) placed on the display surface, for example, often corresponds to a single, round connected component.

More specifically, one aspect of the present invention is directed to a method of detecting a three-dimensional (3D) object adjacent to a user-interactive side of a surface that optically diffuses light, as a function of IR light transmitted toward the 3D object from an opposite side of the surface and reflected back through the surface from the 3D object, to be received by a light sensor disposed on the opposite side of the surface. The method includes the step of creating a first pixilated image representing the intensity of the IR light reflected from the 3D object and received by the light sensor, as well as a first binarized image from the first pixilated image. The first binarized image is created by filtering out pixels of the first pixilated image that do not have an intensity exceeding a first threshold value and represents a first planar distance of the 3D object from the interactive side of the surface. Similarly, a second binarized image is created from the first pixilated image by filtering out pixels of the first pixilated image that do not have an intensity exceeding a second threshold value. This second binarized image has a substantially equal area and coordinate locations as the first binarized image and represents a second planar distance from the interactive side of the surface. A first connected component in the first binarized image then detected and represents a first set of pixels that have an intensity exceeding the first threshold value and are immediately adjacent to each other, without an intervening region of pixels that do not have an intensity exceeding the first threshold value. A first bounding area and a first coordinate location of the first connected component are determined in the first binarized image. A second connected component is detected in the second binarized image and represents a second set of pixels that have an intensity exceeding the second threshold value and are immediately adjacent to each other, without an intervening region of pixels that do not have an intensity exceeding the second threshold value. Also, a second bounding area and a second coordinate location of the second connected component are determined in the second binarized image, which has substantially equal area and coordinate locations as the first binarized image. Next a determination is made whether both the first connected component and the second connected component correspond to the 3D object adjacent to the interactive side of the surface, which is the case, if one of the first connected component and the second connected component is disposed substantially within the bounding area of the other of the first connected component and the second connected component.

In the method, a first label is associated with the first connected component, and a second label is associated with the second connected component. The first label is then associated with the second label if both the first connected component and the second connected component correspond to the 3D object that is adjacent to the interactive side of the surface.

The 3D object can be placed on the surface prior to creating the first pixilated image, such that the first planar distance is substantially zero. If this step is carried out, after creating the first pixilated image, a touch threshold value is determined for pixels that should be included in the first pixilated image. The touch threshold value corresponds to an intensity of the IR light reflected from a portion of the 3D object and received by the light sensor when said portion of the 3D object is contacting the surface. The method also preferably includes the step of setting the first threshold value to the touch threshold value prior to creating the first binarized image, thereby determining whether any portion of the 3D object is contacting the surface. Also, a hover threshold that is different from the touch threshold is preferably determined. The hover threshold corresponds to an intensity of the IR light reflected by the 3D object and received by the light sensor when the 3D object is a determinable distance from the surface on the interactive side of the surface. Prior to creating the second binarized image, the second threshold value is set to the hover threshold, and it is determined whether the 3D object is at least within a hover region away from the surface. The hover region comprises a volume between the surface and a plane that is parallel to the surface and is separated from the surface on the interactive side of the surface by the determinable distance.

The step of determining the hover threshold is preferably performed prior to creating the first binarized image and the second binarized image and includes the step of moving the 3D object toward the surface on the interactive side of the surface from a distance sufficiently far from the surface so that an intensity of the IR light reflected from the 3D object and received by the light sensor initially is not above the first threshold value. A series of pixilated images are then created over time as the 3D object is moved toward the surface. A plurality of calibration connected components, including one calibration connected component corresponding to the 3D object for each of the series of pixilated images is determined. Each calibration connected component comprises a set of immediately adjacent pixels with a corresponding minimum pixel intensity for the IR light received by the light sensor that is greater than zero for each of the sequence of pixilated images. The method then determines which one of the plurality of calibration connected components has a maximum bounding area, and stores as the hover threshold the corresponding minimum pixel intensity that was determined for said one of the plurality of calibration connected components having the maximum bounding area.

The determinable distance is a function of an IR light reflectivity property of the 3D object.

The method can further include the step of creating a second pixilated image an interval of time after creating the first pixilated image, followed by the step of creating a third binarized image from the second pixilated image by filtering out pixels of the second binarized image that do not have an intensity exceeding the hover threshold. The second binarized image and the third binarized image thus comprise a sequence of binarized images at the hover threshold. A third connected component is detected in the third binarized image, and at least one of a third bounding area and a third location of the third connected component are determined in the third binarized image. At least one of a current distance from the surface, a change in distance, and a velocity of the 3D object are determined as a function of at least two of the second bounding area, the third bounding area, the second location, and the third location. As a further step, the method can predict whether the 3D object will contact the surface within a predefined period. An indication that the 3D object has already contacted the surface is produced if the prediction indicates that the 3D object will contact the surface within the predefined period, thereby reducing a latency in providing the indication that the 3D object has contacted the surface.

Another aspect of the present invention is directed to a memory medium on which are stored machine executable instructions for carrying out the steps of the method discussed above.

Still another aspect of the present invention is directed to a system for detecting a relative position of a 3D object. The system includes a surface that diffuses light and has an interactive side adjacent to which the 3D object can be manipulated, as well as an opposite side, i.e., the side opposite the interactive side. A light source spaced away the opposite side of the surface emits an IR light that is transmitted through the surface to the interactive side of the surface. A light sensor is disposed on the opposite side of the surface so as to sense IR light reflected back from the 3D object, through the surface. In communication with the light sensor is a processor. A memory is in communication with the processor and stores data and machine instructions. When executed by the processor the machine instructions cause a plurality of functions to be carried out, generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing Present Invention

Figure 1:
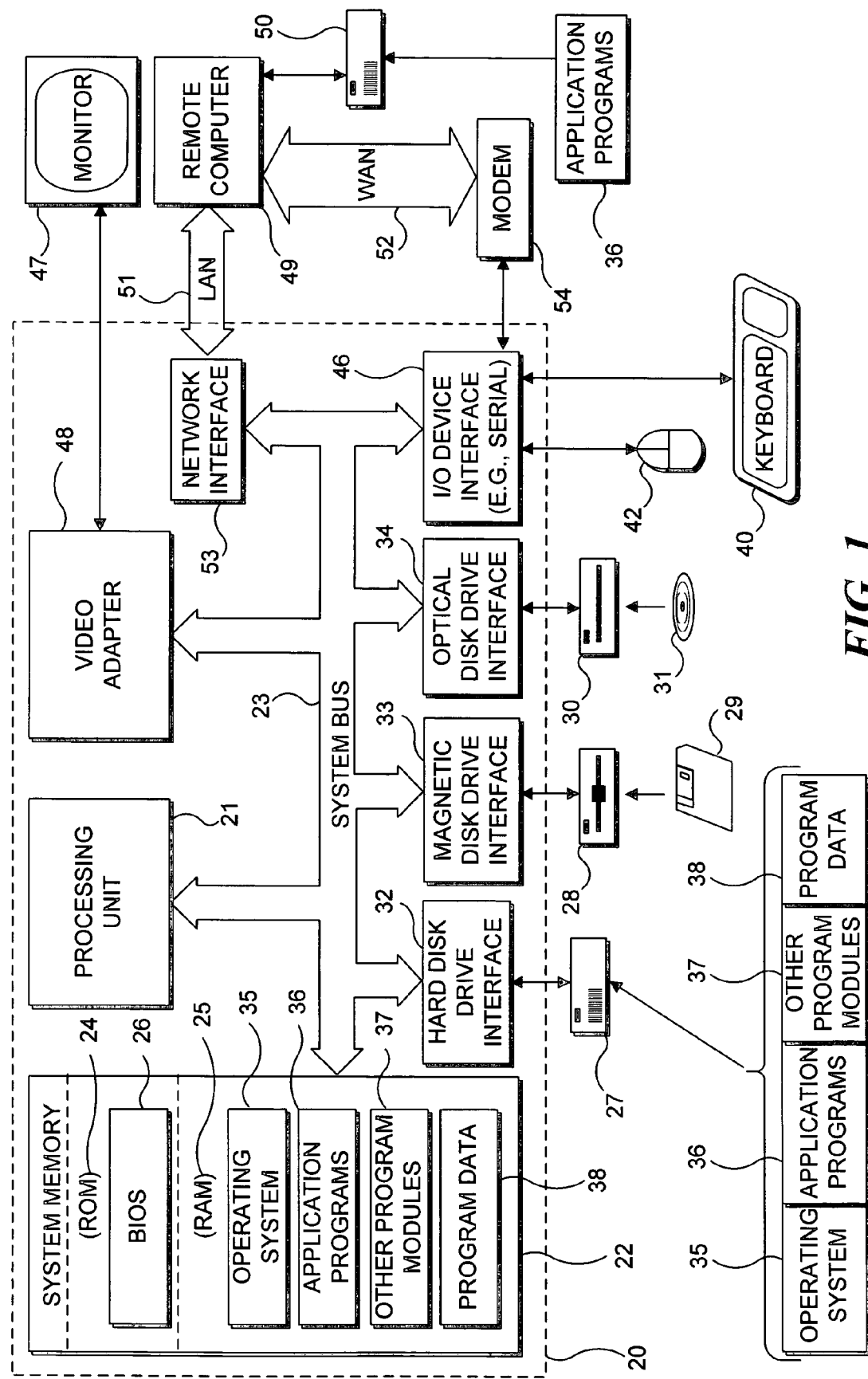
FIG. 1 is a functional block diagram of a generally conventional computing device or personal computer (PC) that is suitable for image processing for the interactive display table as used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
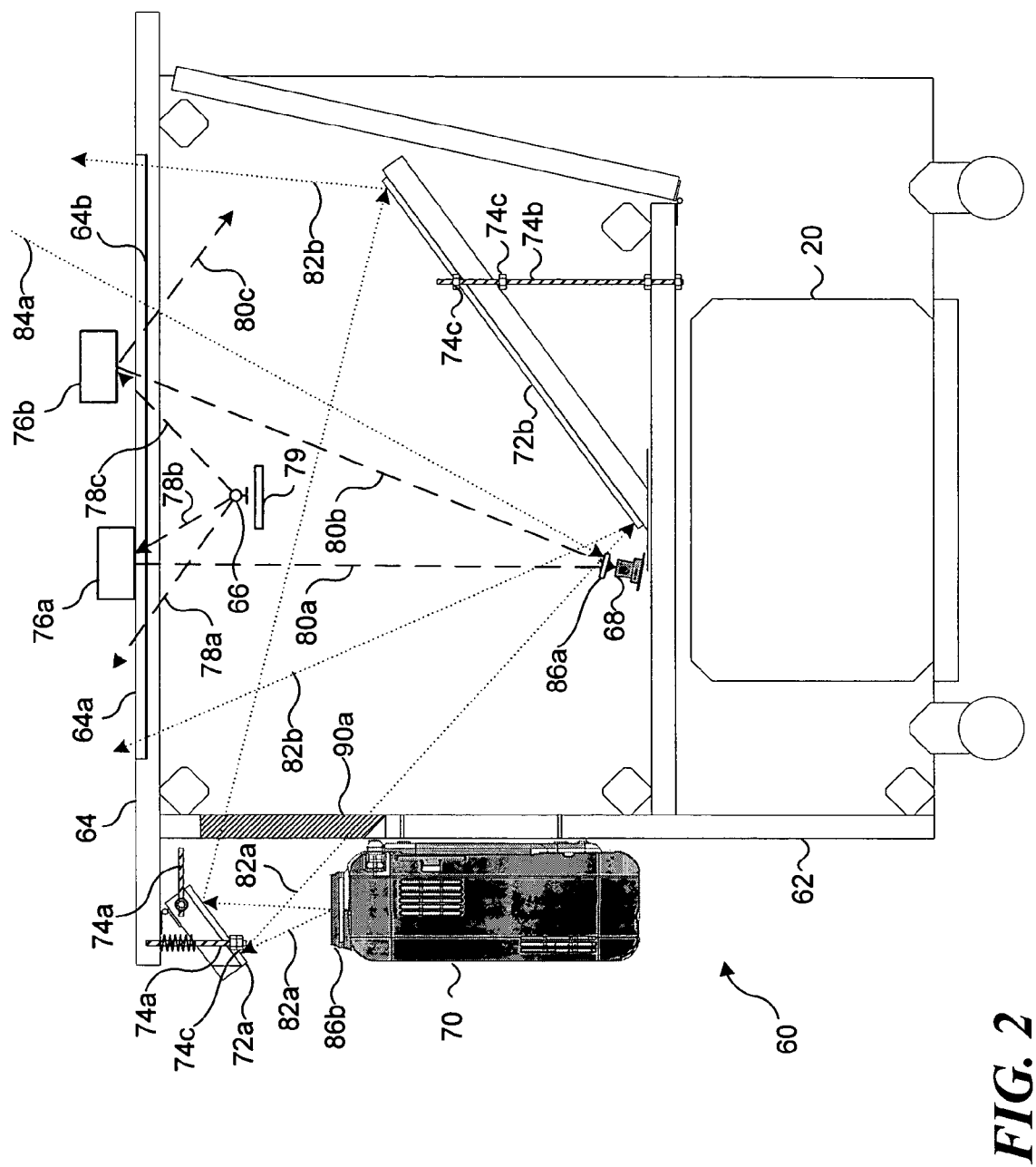
FIG. 2 is an illustration of the interior of the interactive display table showing hardware components included, and the paths followed by light within the interactive display table, and exemplary objects disposed on and above the surface of the interactive display table.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of IR light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The IR light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
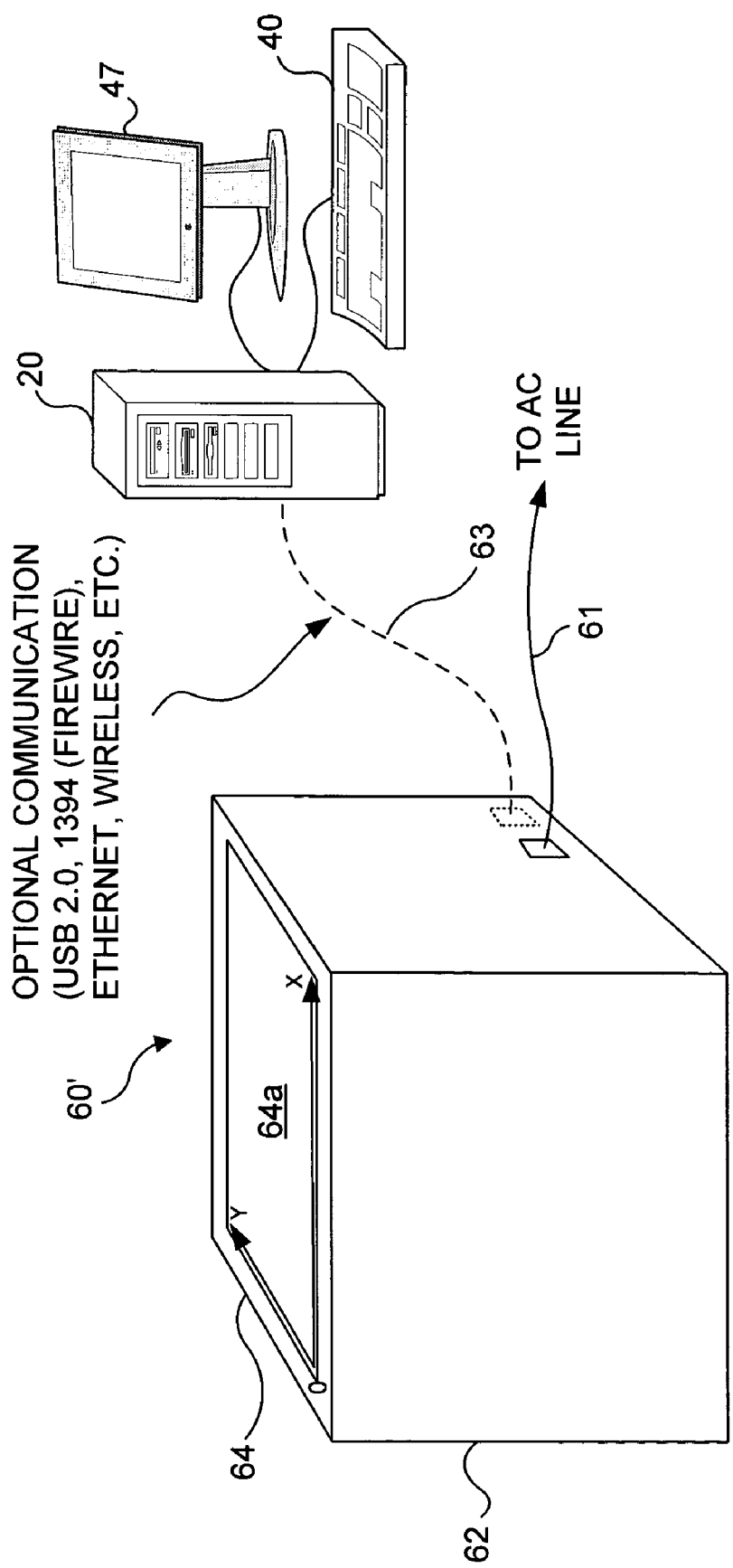
FIG. 3 is an isometric view of an interactive display table coupled to the PC externally.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If the interactive display table is connected to an external PC 20 (as in FIG. 3) or to some other type of external computing device, such as a set top box, video game, laptop computer, or media computer (not shown), then the interactive display table comprises an input/output device. Power for the interactive display table is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table.

An important and powerful feature of the interactive display table (i.e., of either embodiments discussed above) is its ability to display graphic images or a virtual environment for games or other software applications and to enable an interaction between the graphic image or virtual environment visible on display surface 64a and identify objects that are resting atop the display surface, such as a object 76a, or are hovering just above it, such as a object 76b.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

Input Thresholds

Figure 4:
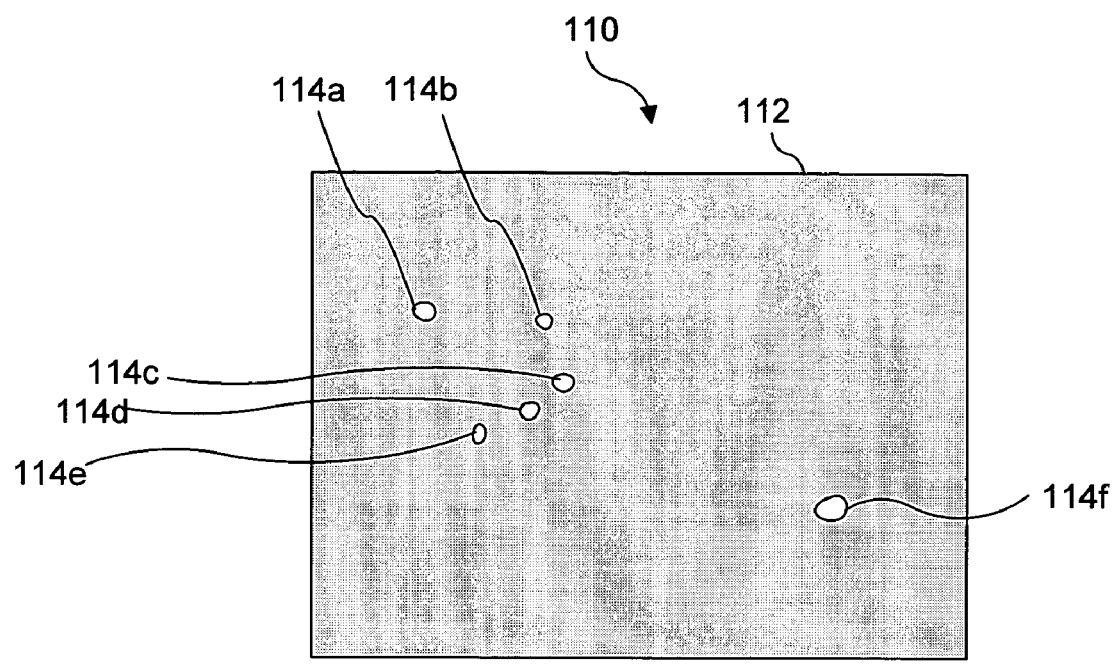
FIG. 4 is a schematic diagram illustrating two hands hovering above the interactive display and having fingertips in contact with the display surface of the interactive display, showing connected objects corresponding to the fingertips, as detected by applying the touch threshold.
Figure 5:
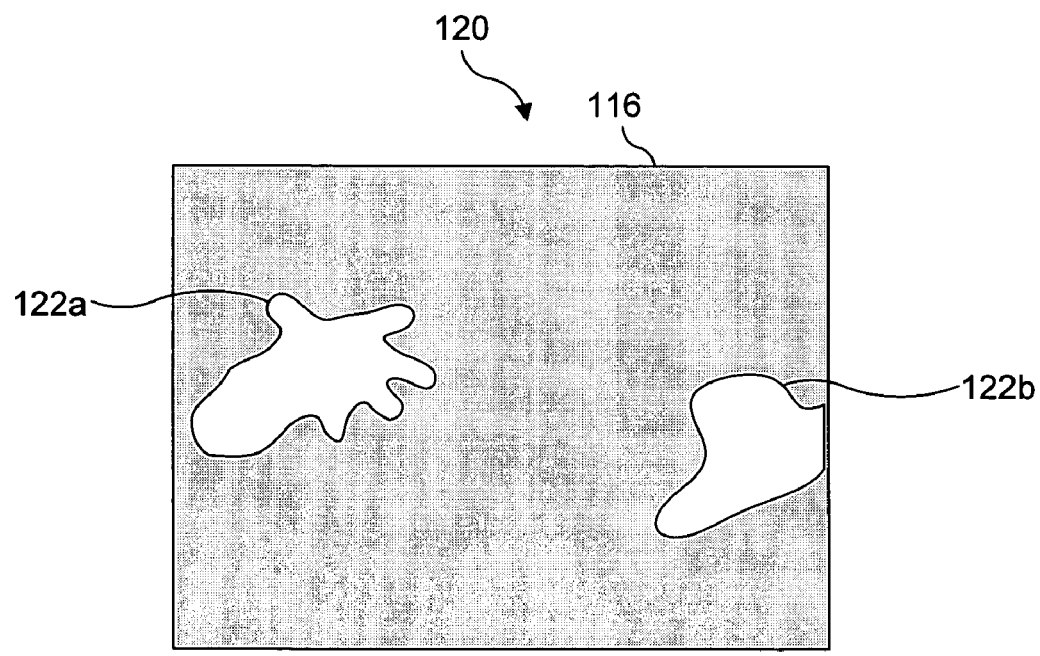
FIG. 5 is a schematic diagram illustrating two hands hovering above the interactive display and having fingertips in contact with the display surface of the interactive display, showing connected objects corresponding to the hands, as detected by applying the hover threshold.

In FIG. 4, an illustration 110 shows a processed image 112 of the display surface with the input threshold set to include pixels (the white regions) having an intensity greater than a "touch" threshold, $T_t$. Objects above the display surface that reflect IR light at an intensity greater than $T_t$ are thus represented by the white or "on" pixels within regions 114a through 114f. By contrast, in FIG. 5 an illustration 120 shows a processed image 116 of the display surface with the input threshold set to include pixels (the white regions) having an intensity greater than a "hover" threshold, $T_h$. Due to the presence of the diffusing layer in the interactive display table and because the illumination is not coherent, objects that are farther from the display surface will reflect IR light at a lower intensity than objects that are touching the display surface. Therefore, $T_h$ is less than $T_t$. In FIG. 5, objects above the display surface that reflect IR light at an intensity greater than $T_h$ are represented by pixels comprising regions 122a and 122b.

The white regions shown in FIGS. 4 and 5 correspond to two hands above the interactive display surface. One hand, corresponding to region 122a in FIG. 5, is "hovering" above the display surface and has five fingertips touching the display surface at five points corresponding to regions 114a through 114e in FIG. 4. The other hand, corresponding to region 122b is also hovering above the display surface and has one fingertip "touching" the display surface at one point corresponding to region 114f. The present invention processes image data like that shown in FIGS. 4 and 5 to determine what objects are either touching or hovering above the display surface, and to determine the location and relationship between the regions detected in the images of the display surface, including the relative separation between an object and the display surface when the object is detected as hovering.

2D Connectivity

Figure 6:
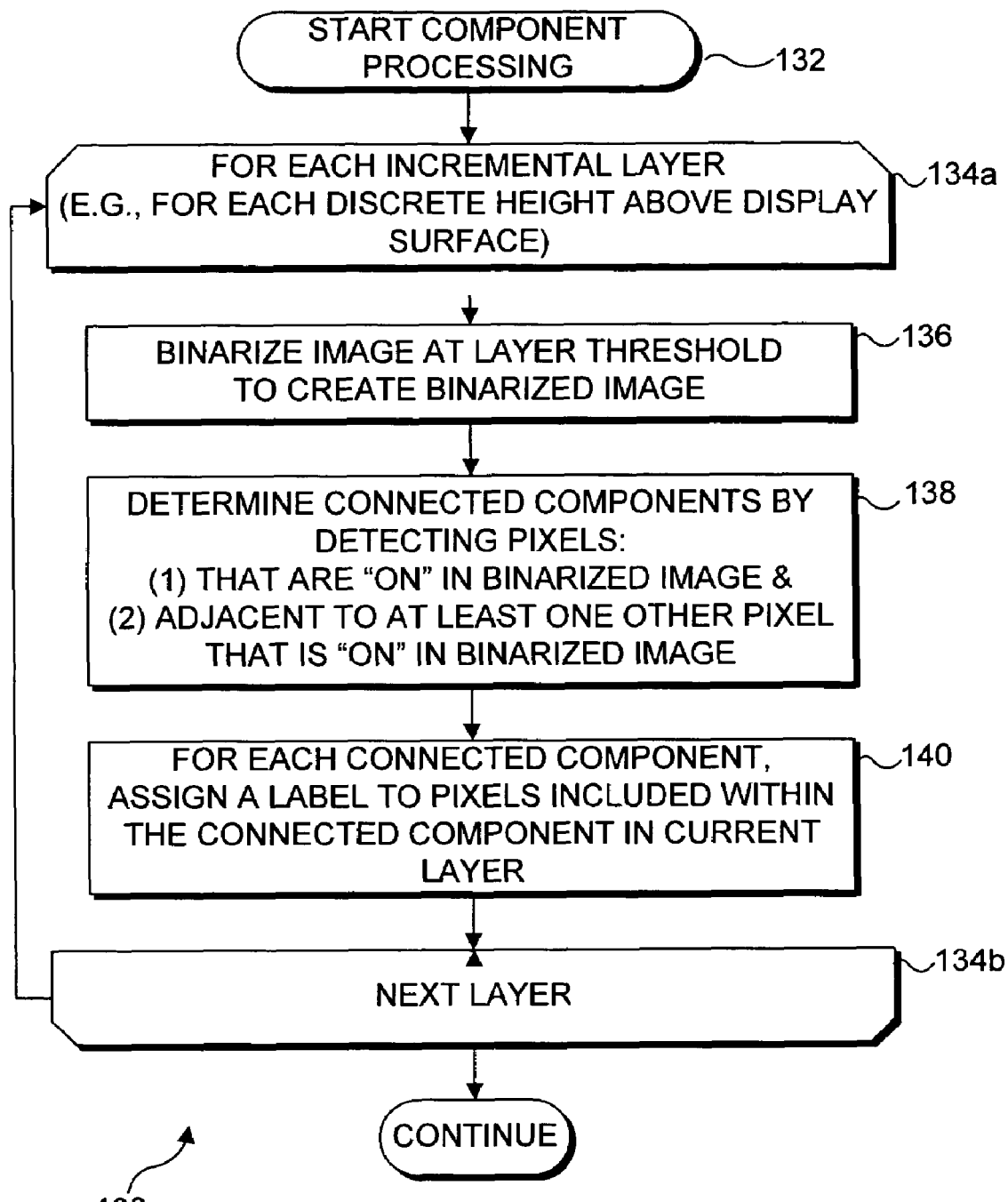
FIG. 6 (Prior Art) illustrates a flow chart showing the process for identifying 2D connected components with regard to successive layers or heights above the display surface.

FIG. 6 illustrates, in an exemplary manner, a prior art process for identifying 2D connected components with regard to successive "layers" (i.e., at different discrete heights above the display surface). There may optionally be four, six, eight, or any other desired number of different layers. As indicated in a flow chart 130, a step 132 begins the process. A loop for processing the connected components in each of the successive layers starts at a block 134a and ends with a block 134b. By reiterating this loop, connected components are determined for successive different layers, with each layer generally corresponding to a different predefined height above the display surface and directly corresponding to the input layer threshold, $T_l$. In a step 136, the gray scale image produced by the IR video camera that receives the IR light reflected from objects above and on the display surface is "binarized" at the layer threshold level. In this step, pixels with intensities less than $T_l$, are considered "off," and pixels with intensities equal or greater than T, are considered "on." This binearization step transforms the gray scale image into a strictly black and white image, with the white portions representing pixels that have an intensity equal or greater than $T_l$.

In a step 138, each white pixel is examined using a sequential algorithm to determine if it is adjacent to another white pixel. If the examined white pixel is adjacent to another white pixel, a step 140 assigns a label to the examined pixel that is the same as the pixel to which it is adjacent. This process thus maintains a list of connected components, assigning the labels for each different connected component, and the corresponding pixels comprising each connected component. A connected component comprises a set of adjacent "on" pixels in the binary image. The pixels correspond to portions of the object that have reflected IR light back toward the IR video camera. The connected component can correspond to the portion of an object placed in contact with the display surface, or to other portions of the object that are hovering above the display surface, depending upon the threshold that is applied for detecting pixels that are "on" in the binary image. The binary image is formed by determining which pixels of a normalized input image are above a predetermined binarization threshold. The connected component detection is performed using standard algorithms such as algorithms described by B. K. P. Horn (see Robot Vision).

The regions shown for objects in FIG. 4 would be processed as a "touch" layer indicating pixels having an intensity greater than the input threshold $T_t$. Regions 114a through 114f represent sets of connected pixels and each region would receive a unique label, as shown in Table 1.

TABLE 1

Tags, Connected Component Sets, and Pixel Labels

| Tag | Pixel Set | Label (Explanation) |
|---|---|---|
| 114a | {(x1, y1)-(x2, y2)} | 1A (Layer 1, connected component A) |
| 114b | {(x3, y3)-(x4, y4)} | 1B (Layer 1, connected component B) |
| 114c | {(x5, y5)-(x6, y6)} | 1C (Layer 1, connected component C) |
| 114d | {(x7, y7)-(x8, y8)} | 1D (Layer 1, connected component D) |
| 114e | {(x9, y9)-(x10, y10)} | 1E (Layer 1, connected component E) |
| 114f | {(x11, y11)-(x12, y12)} | 1F (Layer 1, connected component F) |
| 122a | {(x13, y13)-(x14, y14)} | 2A (Layer 2, connected component A) |
| 122b | {(x15, y15)-(x16, y16)} | 2B (Layer 2, connected component B) |

Regions in FIG. 5 would be processed as a hover layer, indicating pixels with an intensity greater than input threshold $T_h$. Regions 122a and 122b represent sets of connected pixels and each region would receive a unique label as shown in Table 1. The looping through the steps between block 134a and 134b terminates when all layers have been processed. The data stored in a table of this sort is then used in the next phase of the process, discussed below.

3D Connectivity

Figure 7:
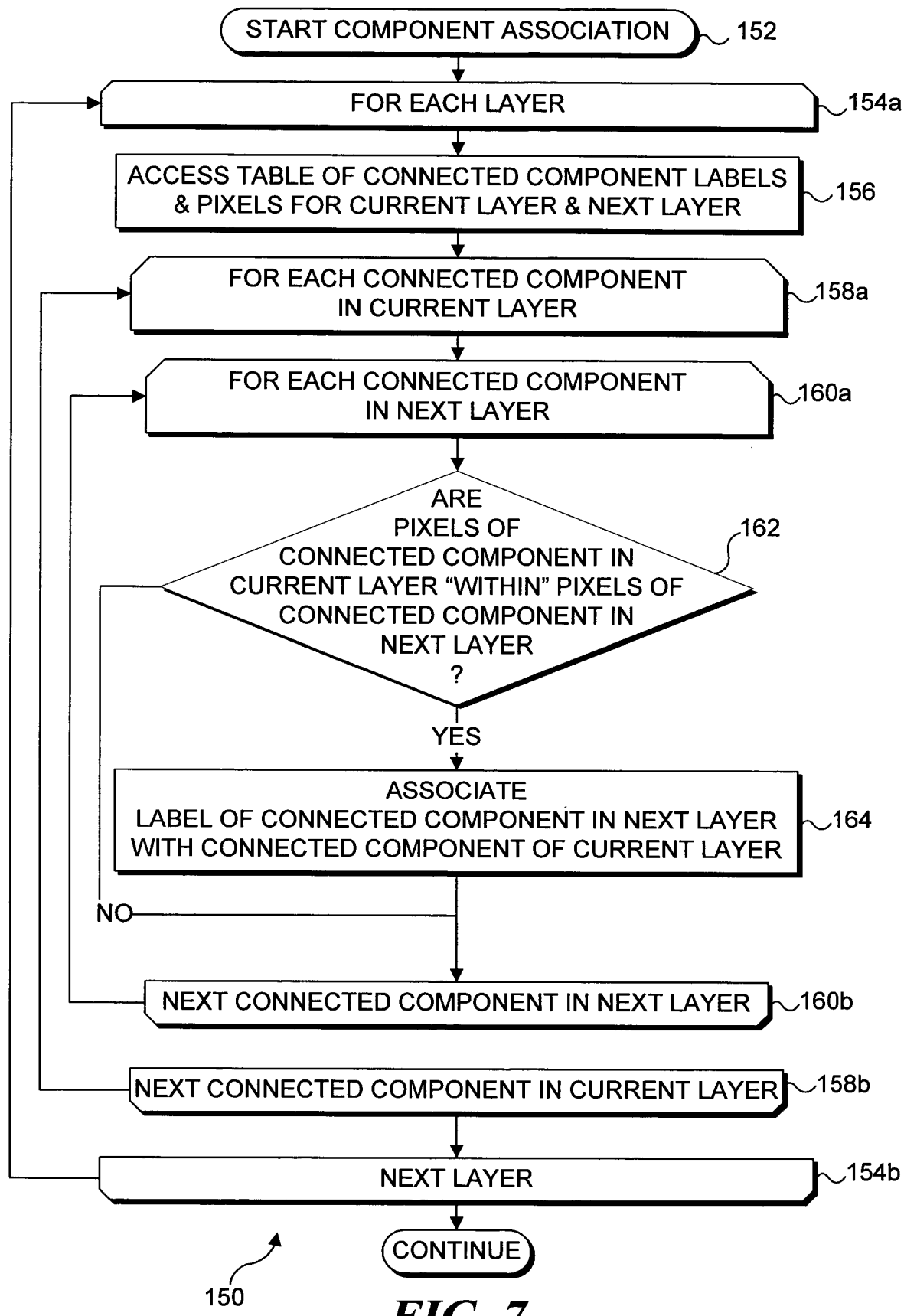
FIG. 7 is a flow chart showing the logical steps for associating connected components to determine 3D connectively.

FIG. 7 illustrates, in an exemplary manner, the process for associating connected components to determine 3D connectively. As indicated in a flow chart 150, a step 152 begins the process. Component associations are determined "layer" by "layer" as indicated in a loop that iteratively completes the steps between a block 154a and a block 154b. In a step 156, the process accesses connected component labels and pixels, e.g., the data in a table created using the process of FIG. 6, for both the "current" and "next" layer. The logic shown in FIG. 7 assumes that the current layer is closer to the display surface than the next layer.

A pair of nested loops respectively carry out steps between a block 158a and a block 158b and between a block 160a and a block 160b. For these two loops, an association between each connected component in a "next" layer is attempted for each connected component in a "current" layer. In a decision step 162, pixel locations of a connected component in the current layer are compared to pixel locations of a connected component in the next layer. If pixel locations of a connected component in the current layer are entirely (or alternatively, if only statistically) within pixel locations of a connected component in the next layer, a step 164 associates the label of the connected component in the next layer with the connected component in the current layer, so that the connected components of these two layers are indicated as being the same. Otherwise, no association is made and the process continues with the next connected component in the next layer, at block 160b.

As indicated above, FIGS. 4 and 5 represent an example in which two hands are disposed above the display surface of the interactive display table with certain fingers touching the display surface. The process shown in the flow chart of FIG. 7 would produce the 3D associations shown in Table 2. While only two layers are used in connection with the example of Table 2, it will be apparent that more than two layers can provide a finer distinction between connected components at varying heights above the display surface, which may be important in certain applications. For example, in a drawing application, it will be useful to employ more than two layers to determine the pressure with which a brush or other flexible object is being applied to the display surface to simulate brush strokes, where the pressure affects how dark and/or how wide the brush stroke appears. Similarly, the pressure applied to a finger contacting the display surface can be detected with multiple layers, to determine how hard a key on a musical instrument (played by interacting with the display surface) is being struck by a user.

TABLE 2

| 3D Associations | | |
|---|---|---|
| "Current" Layer Label (tag) | Associates With | "Next" Layer Label (tag) |
| 1A (114a) | --> | 2A (122a) |
| 1B (114b) | --> | 2A (122a) |
| 1C (114c) | --> | 2A (122a) |
| 1D (114d) | --> | 2A (122a) |
| 1E (114e) | --> | 2A (122a) |
| 1F (114f) | --> | 2B (122b) |

Figure 8:
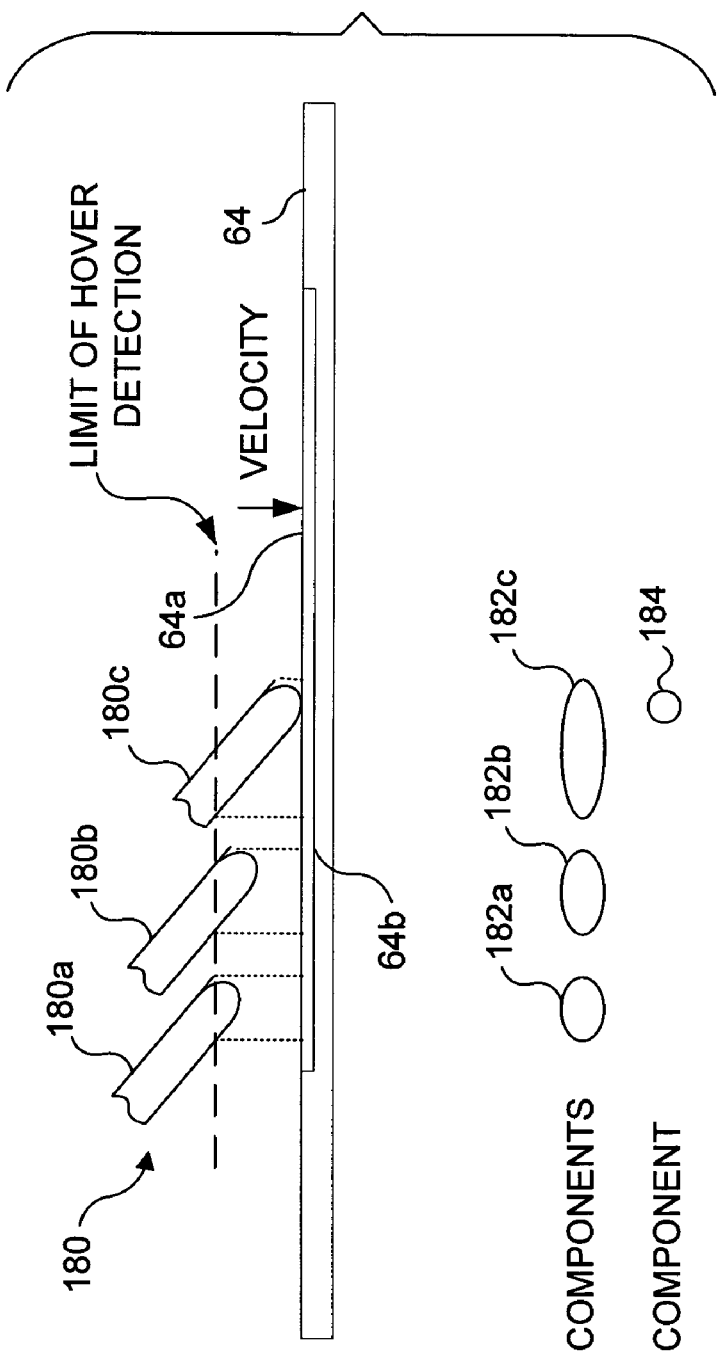
FIG. 8 is a schematic diagram illustrating how the connected components associated with a user's finger change in size as the finger moves toward the display surface, and indicating the velocity of the finger toward the display surface is determinable.

FIG. 8 schematically illustrates a user's finger 180 moving toward display surface 64a past a limit of hover detection, which is typically several centimeters above the display surface. Successively larger hover connected components 182a, 182b, and 182c that are detected according to the above process are illustrated as finger 180 moves through positions 180*a*, 180*b*, and 180*c*, respectively. As the intensity of IR light reflected by the finger and received by the IR video camera of increases, it will be apparent that the size of the hover connected components (which is a function of the total number of adjacent pixels having an intensity greater than a hover threshold) also increases, since IR light reflected by more of the object contributes to the area of the connected component at each successively closer position. However, a touch connected component 184 has a relatively smaller area when finger 180 actually touches the display surface, since the threshold for the intensity of pixels included in the touch connected component is substantially higher than for the hover connected components.

In addition, FIG. 8 indicates that the velocity of finger 180 moving toward contact with display surface 64*a* can be determined. Since successive connected components associated with the same object (i.e., finger 180) can be captured in each successive frame of the IR video camera at known increments of time, the processor in the interactive display system can readily determine the velocity and even the acceleration of the finger or any other object that is moving away from or toward the display surface, based upon the rate at which characteristics of the connected components of the object captured at successive layers or heights above the display surface are changing. It is thus possible to predict when an object with actually contact the display surface before the contact occurs, which is beneficial to reduce the latency of the interactive display system in responding to the object actually contacting the displays surface.

Figure 9:
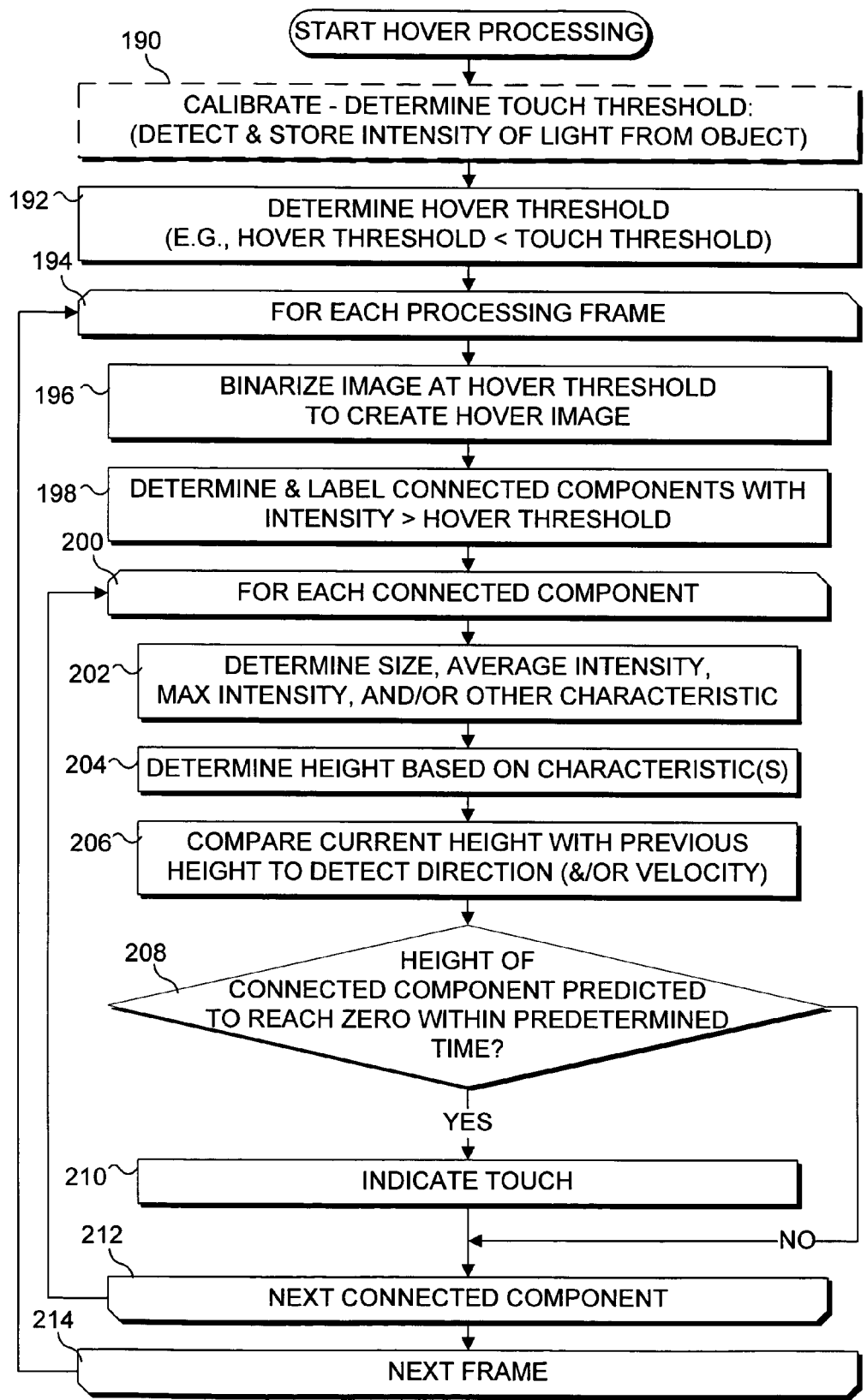
FIG. 9 is a flow chart of the logical steps employed for hover processing as used for prediction of an object contacting the display surface, in connection with the present invention.

The hover threshold can be a predefined fixed offset from the touch threshold. However, different objects may have different hover thresholds, depending on their size, reflectivity, etc. To provide a more flexible determination, the pixel intensity of a specific object can be used to empirically determine the hover threshold and hover height range, as discussed below in regards to FIGS. 10 and 11. FIG. 9 illustrates the logical steps employed for determining hover processing when an object is detected above the display surface. This process starts with an optional step 190, which provides for calibrating the object to determine its touch threshold, i.e., the intensity of the pixels of IR light reflected from the portion of the object in contact with the display surface, when those pixels comprises a connected component with a size equal to the actual area of the object in contact with the display surface. If the calibration is carried out, the touch threshold is stored for the object. A step 192 determines the hover threshold, which is always less than the touch threshold and may be empirically determined, as already noted, or may be based upon a predefined offset from the touch threshold.

An iterative loop is then initiated at a block 194, to process each frame produced by the IR video camera, and this loop continues through the steps discussed below until reaching a block 214, which repeats the loop for the next video frame. Within this loop, a step 196 binarizes the image of the current frame at the hover threshold to create a hover image that includes only white or lighted pixels that are greater in intensity than the hover threshold, and which comprise from zero to a plurality of connected components. Another loop begins with a block 200, to process successive connected components with each loop through the steps until a block 212. In a step 202, the process determines the size, average intensity, maximum intensity, and/or other characteristics of each pixel in the current connected component. This step can also optionally check for a shape that is expected for the object. For example, a round object might be expected to have a round or oval object (if elongate and tilted). A step 204 determines the height of the current connected component based on these characteristic(s). For example, the height can be determined from the normalized image (defined below) of the object above the display surface as:

$$\text{Height} = 1 - \frac{\text{(average pixel value of component)} - \text{(hover threshold)}}{\text{(touch threshold)} - \text{(hover threshold)}}$$

Objects placed on or adjacent to the display surface are illuminated with infrared light that is not of uniform intensity, due to variations in the distance between the infrared light sources and the objects and due to other factors. To normalize an image to compensate for this non-uniformity of illumination, the image is adjusted such that an object of a given reflected brightness appears in the adjusted image with the same brightness regardless of where the object is placed on the display surface. This step is done on a per pixel-basis. Adjusted pixel values l*(x,y) are computed from the input pixel values l(x,y):

$$l^*(x,y) = (l(x,y) - l\_\min(x,y))/(l\_\max(x,y) - l\_\min(x,y))$$

where l_max(x,y) denotes the intensity of the input image at pixel (x,y) when a white sheet of paper is placed over (x,y), and l_min(x,y) denotes the intensity of the input image when no object is placed over (x,y).

Also, the darkest objects placed on the display surface are assigned a pixel value near zero, and the brightest objects placed on the display surface are assigned a pixel value near the greatest allowed value. The result of these two steps produces a normalized image.

Next, a step 206 compares a current height with a previous height of the current connected component to detect a direction and/or velocity of the object either toward or away from the display surface. Optionally, a Kalman filter can be used to clean up the current hovering connected component data and to determine its rate of change in height. A decision step 208 determines if the height of the connected component is predicted to reach zero (i.e., the object contacts the display surface) within a predetermined time. In this step, the current height and velocity of the object are compared against the remaining distance between the object and the display surface, to determine if the object will contact the displays surface. If this step yields an affirmative result, a step 210 provides for indicating that the object will contact the display surface, which will be used by the software application executing on the interactive display system (or on PC 20) to react more quickly to the actual contact, with an apparent reduction in the latency time. As noted above, block 212 advances to the next connected component, and after all connected components have been processed in the current frame, block 214 advances to the next video frame. It will be evident that once the object actually contacts the display surface, hover state no longer needs to be monitored, at least until the object is drawn away from contact with the display surface.

Figure 10:
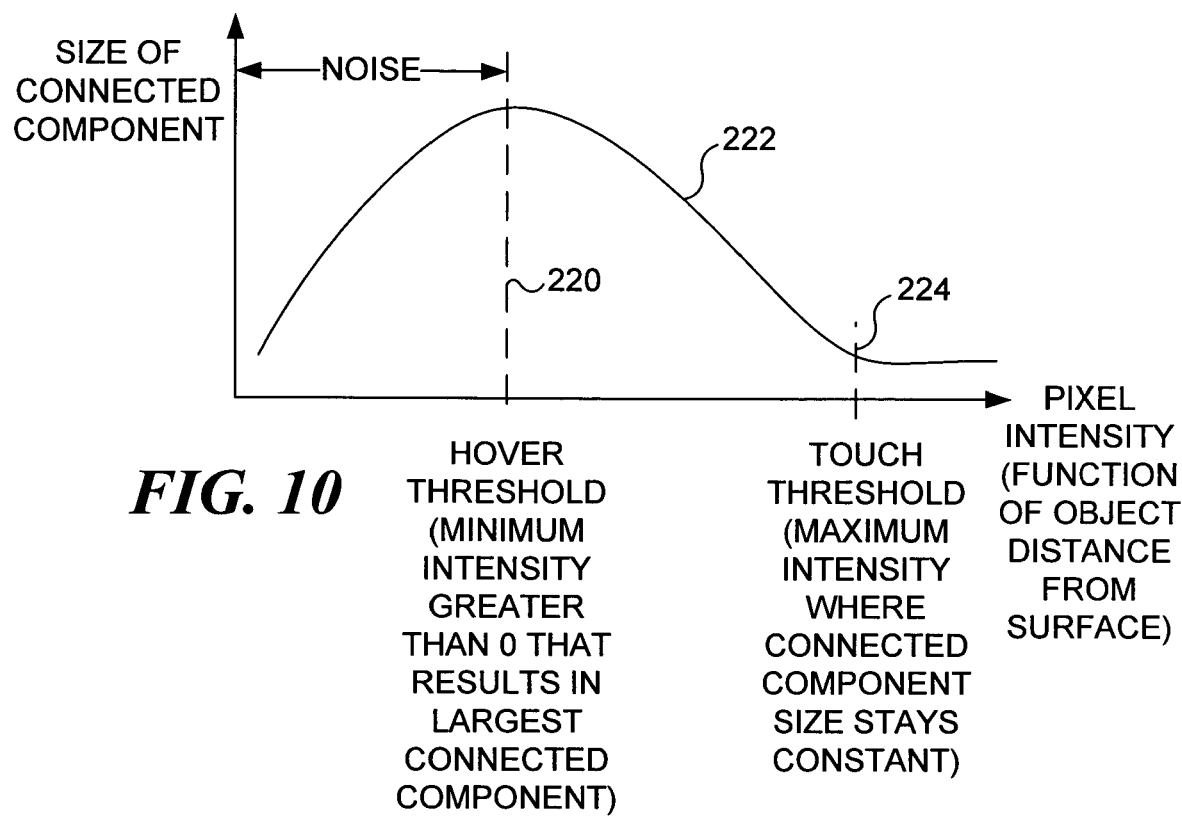
FIG. 10 is a graph illustrating the relationship between a size of the connected component and an intensity of pixels of light received from the object associated with the connected component, for determining a hover threshold for the object.

With reference to FIG. 10, a relationship 222 between the size of the connected component and the intensity of pixels of the connected component is shown graphically, to illustrate how a hover threshold 220 and touch threshold 224 can be empirically determined. When an object is high above the diffuse display surface, only small speckles of pixels are detectable in the reflected IR light received by the IR video camera. However, as the object moves closer to the display surface, the pixels coalesce into a single large connected component with a similar pixel intensity. A minimum pixel intensity that is greater than zero that results in the largest connected component is selected as hover threshold 220. The hover threshold corresponds to the highest point above the surface that the IR video camera can reliably detect an object that is not touching the display surface. Other higher pixel intensity values may be present (e.g., a portion of a sphere that is closest to the surface). However, at a higher intensity value, the size of a corresponding connected component would be smaller. As the object moves further toward the surface, the size of the connected component reaches a constant value with a corresponding pixel intensity that indicates the portion of the object that is in contact with the surface. The range of pixel intensities can be mapped to the height of the object above the surface to provide a detectable hover range above the surface.

Figure 11:
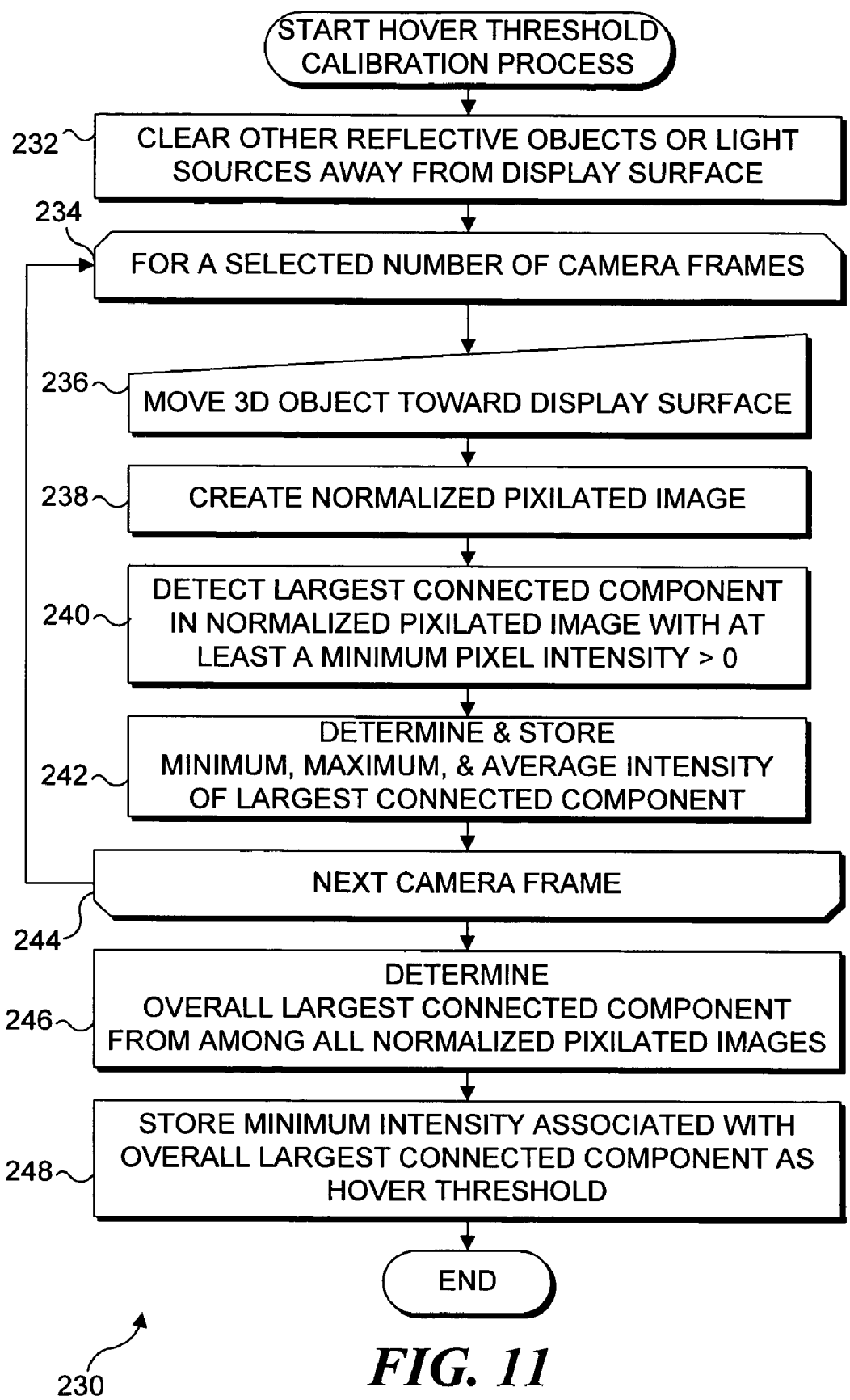
FIG. 11 is a flow chart illustrating the logical steps used in calibrating an object to determine its hover threshold.

The steps of the process used to empirically calibrate an object to determine its hover threshold are illustrated in FIG. 11. It should be understood that this process might be done by the designer of the software application in which the hover of an object is to be detected, or optionally, may be done by a user calibrating the system to determine the optimal hover threshold for the user's finger or some other object, prior to using the object in a software application, e.g., to select options in playing an electronic game with the interactive display system.

This process in flow chart 230 begins with a step 232 in which the user or other person clears away all IR reflective objects or IR light sources from the display surface, to avoid any interference with the calibration process. A loop is then initiated at a block 234, to process a selected number of IR video camera frames and continues through a block 244, where the next video frame is loaded for processing. In a step 236, the 3D object is moved toward the display surface. A step 238 creates a normalized pixilated image for the object based upon the reflected light from the object received by the IR video camera. Next, a step 240 detects the largest connected component in the normalized image with at least a minimum pixel intensity greater than zero. In a step 242, the minimum, maximum, and average pixel intensities are determined for the largest connected component, and the process then advances to block 244 to continue with the next camera frame.

After all of the predefined number of camera frames have been processed, a step 246 determines the largest connection component from among all of the normalized pixilated images (i.e., from all of the video frames processed). A step 248 then stores the minimum intensity associated with the overall largest connected component as the hover threshold for the object being calibrated. The process is then concluded.

Although the present invention has been described in connection with the preferred form of practicing it and modifications thereto, those of ordinary skill in the art will understand that many other modifications can be made to the present invention within the scope of the claims that follow. For example, various heights of connected components can be used to create topographical displays. As a hovering component moves relative to a touching component, the hover component can be used to determine a change in orientation of the hover component and control a rotation angle. Hover detection can be used to initiate display of a menu on the display surface, so that a touch of a menu item with an object (e.g., a user finger) can be detected as a selection of the menu item. Hover can also be used for artistic applications, such as waving hands over the table without touching, to create fuzzy-edged objects. Accordingly, it is not intended that the scope of the invention in any way be limited by the above description, but instead be determined entirely by reference to the claims that follow.

The invention claimed is:

1. A method of detecting a three-dimensional object adjacent to a user-interactive side of a surface that optically diffuses light, as a function of an infrared light transmitted toward the three-dimensional object from an opposite side of the surface and reflected back through the surface from the three-dimensional object to be received by a light sensor disposed on the opposite side of the surface comprising the steps of:

(a) creating a first pixilated image representing the intensity of the infrared light reflected from the three-dimensional object and received by the light sensor;

(b) creating a first binarized image from the first pixilated image by filtering out pixels of the first pixilated image that do not have an intensity exceeding a first threshold value, the first binarized image representing a first planar distance of the three-dimensional object from the interactive side of the surface;

(c) creating a second binarized image from the first pixilated image by filtering out pixels of the first pixilated image that do not have an intensity exceeding a second threshold value, the second binarized image having substantially equal area and coordinate locations as the first binarized image, the second binarized image representing a second planar distance of the three-dimensional object from the interactive side of the surface;

(d) detecting a first connected component in the first binarized image, the first connected component representing a first set of pixels that have an intensity exceeding the first threshold value, the first connected component having a first bounding area defined by a first outer boundary and within which the first set of pixels reside and within which no pixels of the first binarized image have an intensity that fails to exceed the first threshold value;

(e) determining the first bounding area and a first coordinate location of the first connected component in the first binarized image;

(f) detecting a second connected component in the second binarized image, the second connected component representing a second set of pixels that have an intensity exceeding the second threshold value, the second connected component having a second bounding area defined by a second outer boundary and within which the second set of pixels reside and within which no pixels of the second binarized image have an intensity that fails to exceed the second threshold value;

(g) determining the second bounding area and a second coordinate location of the second connected component in the second binarized image that has substantially equal area and coordinate locations as the first binarized image; and (h) determining that both the first connected component and the second connected component correspond to the three-dimensional object adjacent to the interactive side of the surface, if one of the first connected component and the second connected component is disposed substantially within the bounding area of the other of the first connected component and the second connected component.

2. The method of claim 1, further comprising the steps of:
(a) associating a first label with the first connected component;
(b) associating a second label with the second connected component; and
(c) associating the first label with the second label to indicate that both the first connected component and the second connected component correspond to the three-dimensional object that is adjacent to the interactive side of the surface.

3. The method of claim 1, further comprising the steps of:
(a) placing the three-dimensional object on the surface prior to creating the first pixilated image, such that the first planar distance is substantially zero; and
(b) after creating the first pixilated image, determining a touch threshold value for pixels that should be included in the first pixilated image, corresponding to an intensity of the infrared light reflected from a portion of the three-dimensional object and received by the light sensor when said portion of the three-dimensional object is contacting the surface.

4. The method of claim 3, further comprising the step of setting the first threshold value to the touch threshold value prior to creating the first binarized image, thereby determining whether any portion of the three-dimensional object is contacting the surface.

5. The method of claim 3, further comprising the steps of:
(a) determining a hover threshold that is different from the touch threshold, the hover threshold corresponding to an intensity of the infrared light reflected by the three-dimensional object and received by the light sensor when the three-dimensional object is a determinable distance from the surface on the interactive side of the surface;
(b) prior to creating the second binarized image, setting the second threshold value to the hover threshold; and
(c) determining that the three-dimensional object is at least within a hover region away from the surface, the hover region comprising a volume between the surface and a plane that is parallel to the surface and is separated from the surface on the interactive side of the surface by the determinable distance.

6. The method of claim 5, wherein the step of determining the hover threshold is performed prior to creating the first binarized image and the second binarized image, the step of determining the hover threshold comprising the steps of:
(a) moving the three-dimensional object toward the surface on the interactive side of the surface from a distance sufficiently far from the surface so that an intensity of the infrared light reflected from the three-dimensional object and received by the light sensor initially is not above the first threshold value;
(b) creating a series of pixilated images over time as the three-dimensional object is moved toward the surface;
(c) detecting a plurality of calibration connected components, including one calibration connected component corresponding to the three-dimensional object for each of the series of pixilated images, each calibration connected component comprising a set of immediately adjacent pixels with a corresponding minimum pixel intensity for the infrared light received by the light sensor that is greater than zero for each of the sequence of pixilated images;
(d) determining which one of the plurality of calibration connected components has a maximum bounding area; and
(e) storing as the hover threshold the corresponding minimum pixel intensity that was determined for said one of the plurality of calibration connected components that has the maximum bounding area.

7. The method of claim 5, wherein the determinable distance is a function of an infrared light reflectivity property of the three-dimensional object.

8. The method of claim 5, further comprising the steps of:
(a) creating a second pixilated image an interval of time after creating the first pixilated image;
(b) creating a third binarized image from the second pixilated image by filtering out pixels of the second binarized image that do not have an intensity exceeding the hover threshold, so that the second binarized image and the third binarized image comprise a sequence of binarized images at the hover threshold;
(c) detecting a third connected component in the third binarized image;
(d) determining at least one of a third bounding area and a third location of the third connected component in the third binarized image; and
(e) computing at least one of a current distance from the surface, a change in distance, and a velocity of the three-dimensional object as a function of at least two of the second bounding area, the third bounding area, the second location, and the third location.

9. The method of claim 8, further comprising the steps of:
(a) predicting whether the three-dimensional object will contact the surface within a predefined period; and
(b) producing an indication that the three-dimensional object has already contacted the surface if the prediction indicates that the three-dimensional object will contact the surface within the predefined period, thereby reducing latency in providing the indication that the three-dimensional object has contacted the surface.

10. A computer-readable medium encoded with computer-executable instructions for carrying out the steps of claim 1.

11. A system for detecting a relative position of a three-dimensional object, the system comprising:
(a) a surface that diffuses light and has:
(i) an interactive side adjacent to which the three-dimensional object can be manipulated; and
(ii) an opposite side that is opposite the interactive side;
(b) a light source spaced away the opposite side of the surface, the light source emitting an infrared light that is transmitted through the surface to the interactive side of the surface;
(c) a light sensor disposed on the opposite side of the surface so as to sense infrared light reflected back from the three-dimensional object, through the surface;
(d) a processor in communication with the light sensor; and
(e) a memory in communication with the processor, the memory storing data and machine instructions that when executed by the processor cause a plurality of functions to be carried out, including:
(i) creating a first pixilated image representing the intensity of the infrared light reflected from the three-dimensional object and received by the light sensor;
(ii) creating a first binarized image from the first pixilated image by filtering out pixels of the first pixilated image that do not have an intensity exceeding a first threshold value, the first binarized image representing a first planar distance of the three-dimensional object from the interactive side of the surface;

(iii) creating a second binarized image from the first pixilated image by filtering out pixels of the first pixilated image that do not have an intensity exceeding a second threshold value, the second binarized image having substantially equal area and coordinate locations as the first binarized image, the second binarized image representing a second planar distance of the three-dimensional object from the interactive side of the surface;

(iv) detecting a first connected component in the first binarized image, the first connected component representing a first set of pixels that have an intensity exceeding the first threshold value, the first connected component having a first bounding area defined by a first outer boundary and within which the first set of pixels reside and within which no pixels of the first binarized image have an intensity that fails to exceeding the first threshold value;

(v) determining the first bounding area and a first coordinate location of the first connected component in the first binarized image;

(vi) detecting a second connected component in the second binarized image, the second connected component representing a second set of pixels that have an intensity exceeding the second threshold value, the second connected component having a second bounding area defined by a second outer boundary and within which the second set of pixels reside and within which no pixels of the second binarized image have an intensity that fails to exceed the second threshold value;

(vii) determining the second bounding area and a second coordinate location of the second connected component in the second binarized image that has substantially equal area and coordinate locations as the first binarized image; and (viii) determining that both the first connected component and the second connected component correspond to the three-dimensional object adjacent to the interactive side of the surface, if one of the first connected component and the second connected components is disposed substantially within the bounding area of the other of the first connected component and the second connected component.

12. The system of claim 11, wherein the machine language instructions further cause the processor to:
(a) associate a first label with the first connected component;
(b) associate a second label with the second connected component; and
(c) associate the first label with the second label to indicate that both the first connected component and the second connected component correspond to the three-dimensional object that is adjacent to the interactive side of the surface.

13. The system of claim 11, wherein after placing the three-dimensional object on the surface prior to creating the first pixilated image, so that the first planar distance is substantially zero, and after creating the first pixilated image, the machine language instructions further cause the processor to determine a touch threshold value for pixels that should be included in the first pixilated image, corresponding to an intensity of the infrared light reflected from a portion of the three-dimensional object and received by the light sensor when said portion of the three-dimensional object is contacting the surface.

14. The system of claim 13, wherein the machine language instructions further cause the processor to set the first threshold value to the touch threshold value prior to creating the first binarized image, thereby determining whether any portion of the three-dimensional object is contacting the surface.

15. The system of claim 13, wherein the machine language instructions further cause the processor to:
(a) determine a hover threshold that is different from the touch threshold, the hover threshold corresponding to an intensity of the infrared light reflected by the three-dimensional object and received by the light sensor when the three-dimensional object is a determinable distance from the surface on the interactive side of the surface;
(b) prior to creating the second binarized image, set the second threshold value to the hover threshold; and
(c) determine that the three-dimensional object is at least within a hover region away from the surface, the hover region comprising a volume between the surface and a plane that is parallel to the surface and is separated from the surface on the interactive side of the surface by the determinable distance.

16. The system of claim 15, wherein the hover threshold is determined prior to creating the first binarized image and the second binarized image, and wherein the hover threshold is determined by:
(a) moving the three-dimensional object toward the surface on the interactive side of the surface from a distance sufficiently far from the surface so that an intensity of the infrared light reflected from the three-dimensional object and received by the light sensor initially is not above the first threshold value;
(b) creating a series of pixilated images over time as the three-dimensional object is moved toward the surface;
(c) detecting a plurality of calibration connected components, including one calibration connected component corresponding to the three-dimensional object for each of the series of pixilated images, each calibration connected component comprising a set of immediately adjacent pixels with a corresponding minimum pixel intensity for the infrared light received by the light sensor that is greater than zero for each of the sequence of pixilated images;
(d) determining which one of the plurality of calibration connected components has a maximum bounding area; and
(e) storing as the hover threshold the corresponding minimum pixel intensity that was determined for said one of the plurality of calibration connected components that has the maximum bounding area.

17. The system of claim 15, wherein the determinable distance is a function of an infrared light reflectivity property of the three-dimensional object.

18. The system of claim 15, wherein the machine language instructions further cause the processor to:
(a) create a second pixilated image an interval of time after creating the first pixilated image;
(b) create a third binarized image from the second pixilated image by filtering out pixels of the second binarized image that do not have an intensity exceeding the hover threshold, so that the second binarized image and the third binarized image comprise a sequence of binarized images at the hover threshold;

(c) detect a third connected component in the third binarized image;
(d) determine at least one of a third bounding area and a third location of the third connected component in the third binarized image; and
(e) compute at least one of a current distance from the surface, a change in distance, and a velocity of the three-dimensional object as a function of at least two of the second bounding area, the third bounding area, the second location, and the third location.

19. The system of claim 18, wherein the machine language instructions further cause the processor to:
   (a) predict whether the three-dimensional object will contact the surface within a predefined period; and
   (b) produce an indication that the three-dimensional object has already contacted the surface if the prediction indicates that the three-dimensional object will contact the surface within the predefined period, thereby reducing latency in providing the indication that the three-dimensional object has contacted the surface.

20. The system of claim 15, wherein the machine language instructions further cause the processor to respond to a determination that the three-dimensional object is at least within the hover region over a specific predefined portion of the surface, by displaying a predetermined graphic image at the specific predefined portion of the surface, enabling a user to contact a selection within the predetermined graphic image with the three-dimensional object, to select an option displayed there on the surface.

* * * * *